US012717469B2

(12) United States Patent
Yoder et al.

(10) Patent No.: US 12,717,469 B2
(45) Date of Patent: Aug. 25, 2026

(54) SYSTEMS AND METHODS TO REDUCE ACCIDENTAL TOUCH ACTIONS ON A TOUCHSCREEN

(71) Applicant: Intel Corporation, Santa Clara, CA (US)

(72) Inventors: James M. Yoder, Beaverton, OR (US); Prosenjit Ghosh, Portland, OR (US); Jordan Maslov, Portland, OR (US); Surya Pratap Mishra, Portland, OR (US); Tsung-Hsing Hsu, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/956,049

(22) Filed: Sep. 29, 2022

(65) Prior Publication Data

US 2023/0028906 A1 Jan. 26, 2023

(51) Int. Cl.
*G06F 1/16* (2006.01)
*G06F 3/041* (2006.01)
*G06F 3/0488* (2022.01)

(52) U.S. Cl.
CPC .......... *G06F 3/0488* (2013.01); *G06F 1/1677* (2013.01); *G06F 3/0416* (2013.01)

(58) Field of Classification Search
CPC ...... G06F 3/041–047; G06F 2203/041–04114; G06F 1/1641;
(Continued)

(56) References Cited

U.S. PATENT DOCUMENTS 8,713,463 B2 4/2014 Kim et al.
8,842,090 B1 9/2014 Cho et al.
(Continued)

FOREIGN PATENT DOCUMENTS

CN 101788850 A * 7/2010 ......... G06F 3/04883
CN 107688370 B * 11/2023 ........... G06F 1/1686
(Continued)

OTHER PUBLICATIONS

CN-107688370-B (Year: 2023).*
KR-20150095541-A (Year: 2015).*
CN-101788850-A (Year: 2010).*

*Primary Examiner* — Sanjiv D. Patel
(74) *Attorney, Agent, or Firm* — Hanley, Flight & Zimmerman, LLC

(57) ABSTRACT

Systems and methods to reduce accidental touch actions on a touchscreen are disclosed herein. An example electronic device includes a body including a first body portion and a second body portion that is movable relative to the first body portion. The first and second body portions are movable between a folded configuration and an unfolded configuration. The electronic device includes a touchscreen carried by the body, a sensor carried by the body, machine readable instructions, and processor circuitry to be programmed by the machine readable instructions. The processor circuitry is to determine, based on sensor data from the sensor, the body is being folded or unfolded, detect a touch on the touchscreen, and prevent a touch action corresponding to the touch based on the determination the body is being folded or unfolded.

9 Claims, 12 Drawing Sheets

(58) Field of Classification Search

CPC .... G06F 1/1652; G06F 1/1677; G06F 1/1616; G06F 1/1618; G06F 2200/1637; G06F 1/3265; G06F 1/1647; G09G 2340/0492; G09G 3/035; G09G 5/14; G09G 2380/02

See application file for complete search history.

(56) References Cited

U.S. PATENT DOCUMENTS

| | | | | |
|---|---|---|---|---|
| 9,213,432 | B2 | 12/2015 | Hwang et al. | |
| 10,152,153 | B2 | 12/2018 | Jung et al. | |
| 10,514,797 | B2 | 12/2019 | Kugler et al. | |
| 2011/0272088 | A1* | 11/2011 | Cincotti | F41H 3/02 156/247 |
| 2014/0028597 | A1* | 1/2014 | Cho | G06F 3/04842 345/173 |
| 2016/0246330 | A1* | 8/2016 | Kim | G06F 1/1652 |
| 2018/0330694 | A1* | 11/2018 | Klein | G06F 9/44505 |
| 2022/0057866 | A1* | 2/2022 | Xu | G06F 3/0485 |
| 2022/0261045 | A1* | 8/2022 | Park | H04M 1/0245 |
| 2023/0039953 | A1* | 2/2023 | Seger, Jr. | G06F 3/04886 |
| 2023/0129250 | A1* | 4/2023 | Sung | H04M 1/72454 |
| 2024/0302867 | A1* | 9/2024 | Wang | H04M 1/0214 |

FOREIGN PATENT DOCUMENTS

| | | | | |
|---|---|---|---|---|
| JP | 6896370 B2 | | 6/2021 | |
| KR | 20150095541 A | * | 8/2015 | G06F 3/048 |

* cited by examiner

SYSTEMS AND METHODS TO REDUCE ACCIDENTAL TOUCH ACTIONS ON A TOUCHSCREEN

FIELD OF THE DISCLOSURE

This disclosure relates generally to touchscreens and, more particularly, to systems and methods to reduce accidental touch actions on a touchscreen.

BACKGROUND

Some known electronic devices, such as tablets or phones, have foldable touchscreen displays. Foldable displays enable the electronic device to provide a large screen, but exhibit a small form factor for easier transportation or storage.

BRIEF DESCRIPTION OF THE DRAWINGS

In FIG. 1, the example electronic device is in an unfolded configuration.

Figure 1:
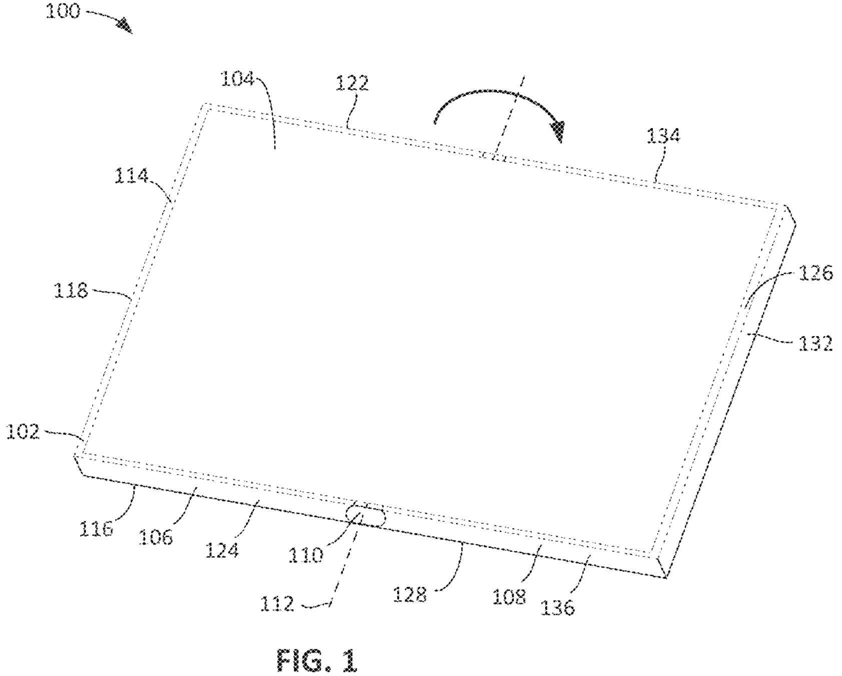
FIG. 1 illustrates an example electronic device having a foldable touchscreen.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Many electronic devices, such as tablets, smartphones, and laptops are configurable into one or more configurations or postures. For example, foldable tablets can be transitioned between an unfolded configuration (e.g., for full screen use) and a folded configuration (e.g., for storage or transportation). Some such devices fold so that the display is contained within a clam shell housing. Additionally or alternatively, some devices have displays that wrap around the housing so that content may be displayed on both sides of the device in a manner analogous to a book cover. These tablets typically have a flexible touchscreen that is foldable. To transition an electronic device between a first configuration and a second configuration, a person may grip or grasp the sides or edges of the body of the electronic device. However, during this process, one or more portions of the person's hands (e.g., their thumb, their palm, etc.) may additionally or alternatively contact the touchscreen (e.g., contact an area near an edge of the touchscreen). This touchscreen contact may occur at the location of a button or selectable graphical element and may therefore be recognized (e.g., erroneously) by the electronic device as a touch action. As used herein, a touch action is a touch on a touchscreen that triggers an action, function, or command, such as closing a window, opening the start menu, selecting a button on a webpage, scrolling, opening an app, starting a program, etc. A touch action may also be referred to as a touch event or touch command. The touch may be any type of touch, such as a short tap, a long touch and hold, a series of taps, or a swipe. A touch may also be a touch from a single finger (or portion of the hand) or multiple fingers (or multiple portions of the hand). The touch action may not be intended by the user, but may be an inadvertent result of handling the electronic device. As such, while moving and/or handling the electronic device, the user may accidentally trigger a touch action or touch command that was unintended. Such unintended touch actions are also referred to herein as "inadvertent touch actions," "unintended touch actions," and/or "accidental touch actions."

Disclosed herein are example systems and methods to identify accidental touch actions on a touchscreen of an electronic device. Examples disclosed herein reduce or prevent triggering of undesired actions that are the result of accidental touching, which may occur while the user is handling the electronic device (e.g., while transitioning the electronic device between configurations (e.g., unfolded and folded), transporting the electronic device, and/or otherwise handling the electronic device without the intent of triggering a touch action via the touchscreen). By identifying accidental touch actions and preventing the corresponding action from being carried out by the electronic device, examples disclosed herein may reduce user frustration and save energy by preventing unnecessary electronic activities.

An example electronic device disclosed herein includes a body and a touchscreen carried by the body. The body may have two or more body portions that move relative to each other. For example, the electronic device may be a foldable tablet that includes a first body portion and a second body portion that are coupled by a hinge. The body can be transitioned between at least an unfolded configuration and at least one folded configuration.

In some examples disclosed herein, the example electronic device includes a grip sensor carried by the body. In some examples, the grip sensor is carried by (e.g., disposed on) a bezel around the touchscreen. Additionally or alternatively, the grip sensor can be disposed on at least one of the side edges, on the bottom, or another location on the body. Therefore, the grip sensor can sense or detect when a person grips the electronic device in a manner indicative of the person folding or unfolding the body. The electronic device includes an example user interface control system (e.g., processor circuitry executing software). The user interface control system can detect or determine if the person is gripping the body based on sensor data from the grip sensor. If the user interface control system detects the person is gripping the body on the grip sensor, the system ignores or rejects any touch action that may occur as the result of a touch on the touchscreen. As such, the example user interface control system prevents accidental touch actions while the person is folding/unfolding the electronic device. In some examples, the user interface control system only ignores or rejects touch actions that occur within a proximity (e.g., two or three inches) of the location of the touch on the grip sensor. For example, while gripping an edge of the body, the person's palm may touch or contact the grip sensor and the person's thumb may touch or contact the touchscreen adjacent to the location on the grip sensor.

Additionally or alternatively, the user interface control system may use one or more other inputs to determine when to ignore, reject, and/or not initiate the touch action(s). For example, the electronic device may include a motion sensor, such as a hinge angle sensor, a gyroscope, and/or an accelerometer. The example user interface control system can determine, based on sensor data from the motion sensor, if the electronic device is being folded or unfolded. If the user interface control system determines the electronic device is being folded or unfolded, the user interface control system ignores, rejects, and/or does not initiate any touch actions corresponding to touches that may occur on the touchscreen. Thus, the example systems and methods disclosed herein significantly reduce (e.g., minimize), suppress, and/or prevent accidental touch actions while handling an electronic device.

FIG. 1 illustrates an example electronic device 100 in which examples disclosed herein can be implemented. In this example, the electronic device 100 is implemented as a tablet. However, other examples disclosed herein can employ other types of electronic device, such as phones, laptops, and/or any other electronic device having a touchscreen.

In the illustrated example, the electronic device 100 includes a body 102, sometimes referred to as a casing, chassis, or frame. The electronic device 100 also includes a touchscreen 104 carried by the body 102. The touchscreen 104 includes a display and a touch sensor covering the display. The touchscreen 104 is capable of displaying various user interface screens and/or graphical elements that can be selected (e.g., via touch on the touchscreen 104) by a person. The touchscreen 104 can be implemented as any type of display. In some examples, the touchscreen 104 is an organic light-emitting diode (OLED) display. In other examples the touchscreen 104 can be another type of display, such as a liquid crystal diode (LCD) display or a micro light-emitting diode (LED) display.

Figure 2:
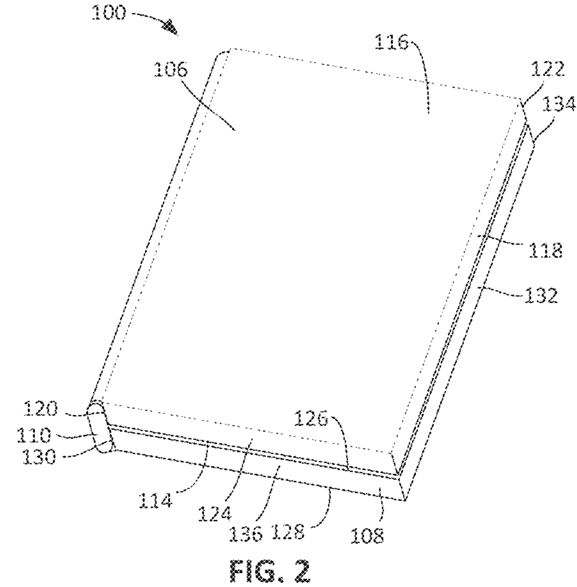
FIG. 2 illustrates the example electronic device of FIG. 1 in a folded configuration.

In this example, the electronic device 100 is foldable, which is beneficial in several ways including, for example, to reduce the size of the electronic device 100 while transporting and/or storing the electronic device 100. In the illustrated example, the body 102 includes a first body portion 106 and a second body portion 108 that is movable relative to the first body portion 106. The first and second body portions 106, 108 are movably coupled. In particular, in this example, the first and second body portions 106, 108 are coupled via a hinge 110. The hinge 110 forms a folding axis 112 that the first and second body portions 106, 108 rotate about relative to each other. The first and second body portions 106, 108 are movable (rotatable) between an unfolded configuration, as shown in FIG. 1, and a folded configuration, as shown in FIG. 2. The touchscreen 104 is foldable or bendable. For example, the touchscreen 104 may be a foldable or flexible organic light-emitting diode (FOLED) display. This enables the touchscreen 104 to be folded with the first and second body portions 106, 108. In other examples, the first and second body portions 106, 108 can be movably coupled in other manners and/or can be arranged for movement in other configurations.

Referring to FIGS. 1 and 2, the first body portion 106 has a top side 114, a bottom side 116 opposite the top side 114, a first edge 118, a second edge 120 opposite the first edge 118, a third edge 122, and a fourth edge 124 opposite the third edge 122. Similarly, the second body portion 108 has a top side 126, a bottom side 128 opposite the top side 126, a first edge 130, a second edge 132 opposite the first edge 130, a third edge 134, and a fourth edge 136 opposite the third edge 134. The second edge 120 of the first body portion 106 and the first edge 130 of the second body portion 108 are coupled at the hinge 110. In this example, the touchscreen 104 is a foldable touchscreen that extends across the top sides 114, 126 of both the first and second body portions 106, 108.

Figure 3:
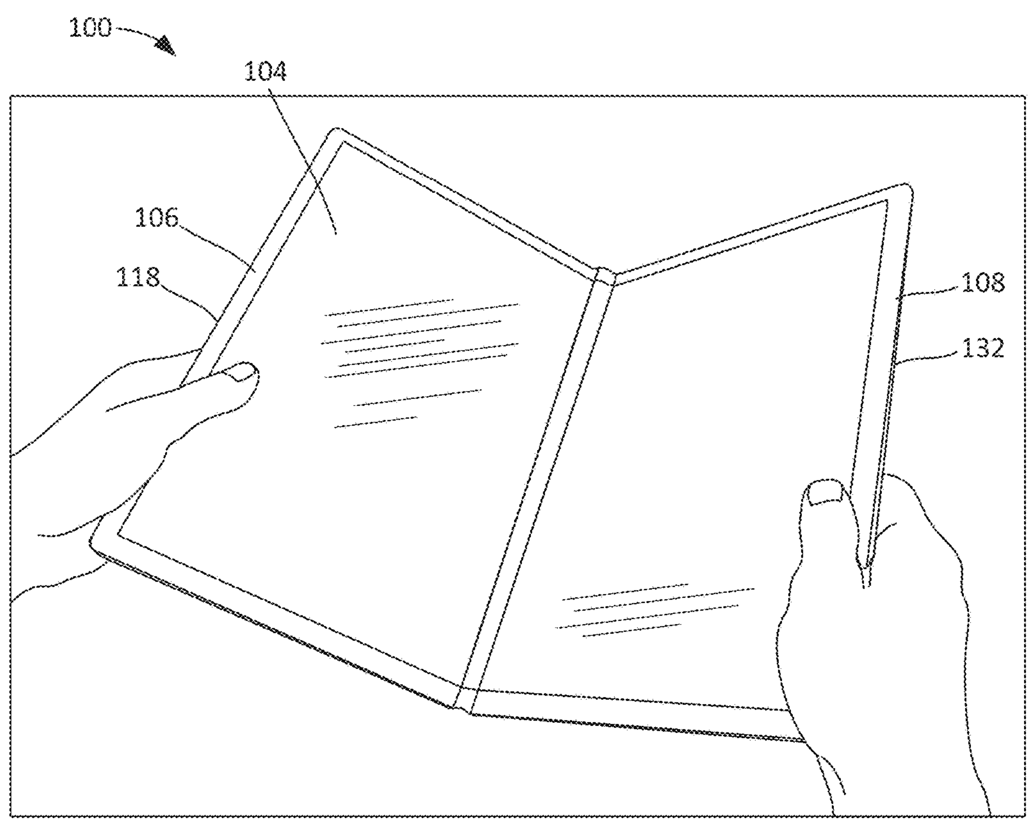
FIG. 3 shows an example of a person folding the example electronic device of FIG. 1.

FIG. 3 shows a person folding the electronic device 100. To fold the electronic device 100 (i.e., move the first and second body portions 106, 108 from the unfolded configuration (FIG. 1) to the folded configuration (FIG. 2)), the person grips the first and second body portions 106, 108 and rotates the first and second body portions 106, 108 toward each other. For example, the person may grip the first body portion 106 along the first edge 118 and the second body portion 108 along the second edge 132. However, when gripping the first and second body portions 106, 108, the person's fingers and/or other parts of their hands may contact or touch the touchscreen 104. This contact may occur at the location of one or more selectable graphical elements that cause triggers a touch action (e.g., activates a function), such as closing a browser, opening a start menu, etc. Therefore, the user may accidentally cause a touch action they do not intend to perform. Disclosed herein are example systems and methods that reduce or prevent this accidental triggering of touch actions.

Figure 4:
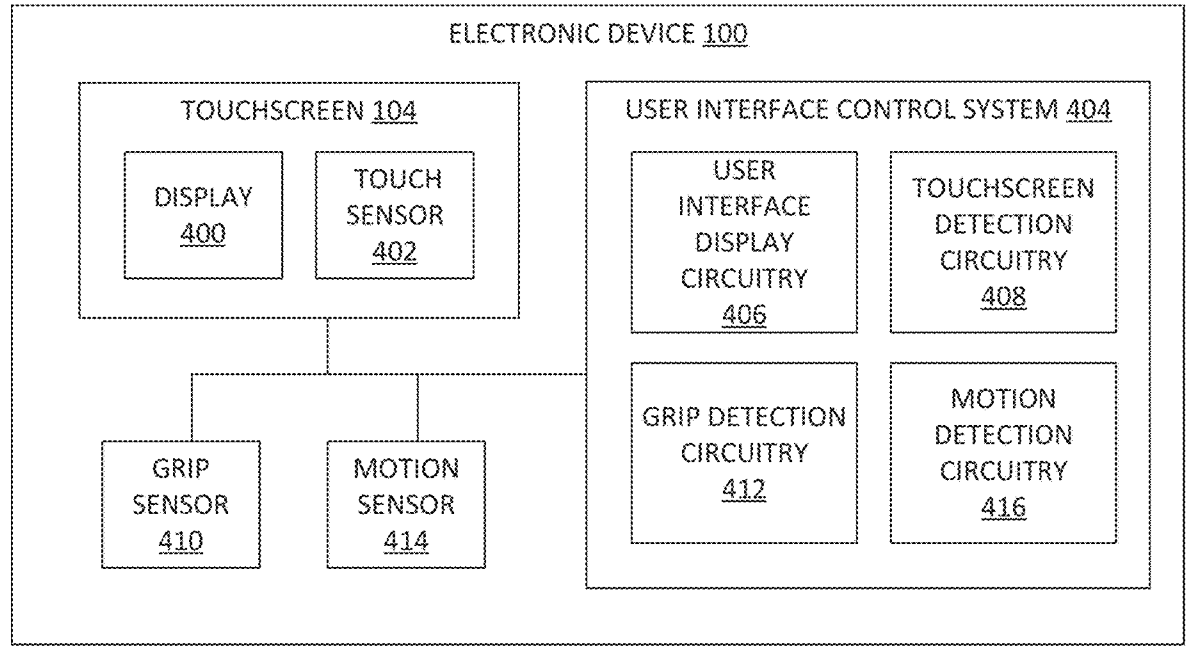
FIG. 4 is a block diagram of the example electronic device of FIG. 1 having an example user interface control system.

FIG. 4 is a block diagram of an example implementation of the example electronic device 100. As disclosed above, the electronic device 100 includes the touchscreen 104. The touchscreen 104 includes a display 400 (e.g., an OLED display) and a touch sensor 402 (e.g., a capacitive touch sensor). The touch sensor 402 overlays the display 400. In some examples, the touch sensor 402 is a capacitive touch sensor. The touch sensor 402 can detect a touch or contact at many locations on the touchscreen 104 (e.g., at any location).

In the illustrated example, the electronic device 100 includes a user interface control system 404, which controls the content displayed on the touchscreen 104. The user interface control system 404 of FIG. 4 may be instantiated (e.g., creating an instance of, bring into being for any length of time, materialize, implement, etc.) by processor circuitry such as a central processing unit executing instructions. Additionally or alternatively, the user interface control system 404 of FIG. 4 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 4 may, thus, be instantiated at the same or different times. Some or all of the circuitry may be instantiated, for example, in one or more threads executing concurrently on hardware and/or in series on hardware. Moreover, in some examples, some or all of the circuitry of FIG. 4 may be implemented by microprocessor circuitry executing instructions to implement one or more virtual machines and/or containers.

As described above, the user interface control system 404 may be implemented by processor circuitry. In such an example, the processor circuitry is carried by the body 102 (FIGS. 1-2) of the electronic device 100. For example, the processor circuitry can be disposed in one or both of the first and second body portions 106, 108. In the illustrated example, the user interface control system 404 includes user interface display circuitry 406. The user interface display circuitry 406 controls the user interface content presented on the display 400 of the touchscreen 104. The user interface display circuitry 406 can cause the display 400 to present any user interface screens and/or graphical user content (e.g., a background image, icons, webpages, apps, videos, pictures, etc.). The user interface display circuitry 406 also provides means for means for preventing a touch action corresponding to a touch, as disclosed in further detail herein. In some examples, the user interface display circuitry 406 is instantiated by processor circuitry executing instructions and/or configured to perform operations such as those represented by the flowcharts of FIGS. 14 and 15.

In the illustrated example, the user interface control system 404 includes touchscreen detection circuitry 408. The touchscreen detection circuitry 408 determines or detects, based on sensor data (e.g., signals) from the touch sensor 402, whether a person has touched the touchscreen 104 and the location of the touch. Therefore, the touchscreen detection circuitry 408 provides means for detecting a touch on the touchscreen 104. If the touch occurs at a location of a selectable graphical element associated with ah touch action, the user interface display circuitry 406 perform one or more functions or actions associated with the touch action. For example, if the person touches a "close" icon on a web browser, the user interface display circuitry 406 causes the web browser page to close. In some examples, the touchscreen detection circuitry 408 is instantiated by processor circuitry executing instructions and/or configured to perform operations such as those represented by the flowcharts of FIGS. 14 and/or 15.

To determine whether a touch action is an accidental touch action, such as when folding the electronic device 100, the electronic device 100 includes one or more sensors. For example, in FIG. 4, the electronic device 100 includes an example grip sensor 410. The grip sensor 410 is carried by (e.g., coupled to, disposed on, etc.) the body 102. In some examples, the grip sensor 410 is a capacitive touch sensor, similar to the touch sensor 402. Additionally or alternatively, the grip sensor 410 can include another type of touch sensor, such as a resistive sensor. In some examples, the grip sensor 410 is disposed on or below one of the sides or edges of the body 102 around the touchscreen 104, as disclosed in further detail herein. The grip sensor 410 can detect when a person touches and/or otherwise makes contact with the body 102 where the grip sensor 410 is located. Therefore, the grip sensor 410 provides means for detecting a touch on the grip sensor 410 and/or another portion of the electronic device 100. In the illustrated example, the user interface control system 404 includes grip detection circuitry 412. The grip detection circuitry 412 detects or determines, based on sensor data (e.g., signals) from the grip sensor 410, if a person is gripping one or more portions of the body 102 around the touchscreen 104, which my occur when the person is folding the electronic device 100. The grip detection circuitry 412 also determines the location of the gripping. In some examples, the grip detection circuitry 412 is instantiated by processor circuitry executing instructions and/or configured to perform operations such as those represented by the flowcharts of FIGS. 14 and 15. In some examples, the touchscreen detection circuitry 408 and the grip detection circuitry 412 are implemented as the same touch controller or chip. In other examples, the touchscreen detection circuitry 408 and the grip detection circuitry 412 are implemented as separate controllers or chips that work together, such as a daisy chain.

In the illustrated example, the electronic device 100 also includes a motion sensor 414. The motion sensor 414 is carried by (e.g., coupled to, disposed in, etc.) the body 102. The motion sensor 414 can be implemented by one or more sensors or devices (e.g., a hinge angle sensor, a gyroscope, an accelerometer, a camera) that detect or sense motion indicative of folding or unfolding the electronic device. The motion sensor 414 provides means for sensing relative motion of the first and second body portions 106, 108. In the illustrated example, the user interface control system 404 includes motion detection circuitry 416. The motion detection circuitry 416 detects or determines, based on sensor data (e.g., signals) from the motion sensor 414, if the body 102 of the electronic device 100 is being folded or unfolded. Therefore, the motion detection circuitry 416 provides means for determining the body 102 is being folded or unfolded based input from motion sensor 414. In some examples, the motion detection circuitry 416 is instantiated by processor circuitry executing instructions and/or configured to perform operations such as those represented by the flowcharts of FIGS. 14 and 15.

In some examples, input from both the grip sensor 410 and the motion sensor 414 is used to determine if the electronic device 100 is being folded or unfolded. In other examples, input from only one of the sensors 410, 414 may be used. Therefore, in some examples, the electronic device 100 may only include one of the sensors 410, 414. Examples of how the sensors 410, 414 are used are disclosed in further detail herein.

Figure 5:
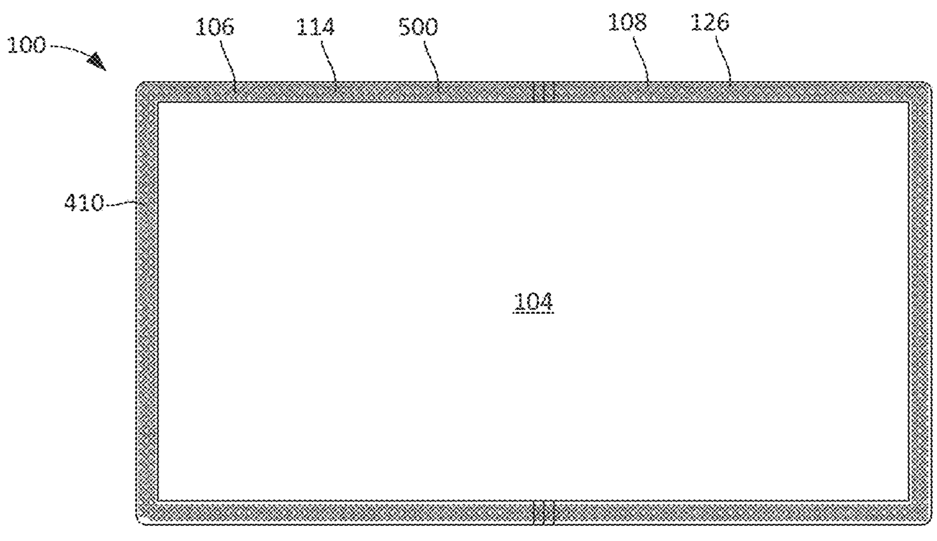
FIG. 5 is a top view of the example electronic device of FIG. 1 showing an example grip sensor on an example frame bezel of the example electronic device.

As disclosed above, the grip sensor 410 may be disposed on one or more sides and/or edges of the body 102 of the electronic device 100. FIG. 5 is a top view of the example electronic device 100. The top sides 114, 126 of the first and second body portions 106, 108 form a frame bezel 500 around the touchscreen 104. In this example, the grip sensor 410 (shown as a shaded region) is carried by the frame bezel 500 (e.g., disposed on a top or outward facing side of the frame bezel 500). The grip sensor 410 may be coupled to the frame bezel 500 via an adhesive or other fastening means (e.g., a mechanical and/or chemical fastener). In this example, the grip sensor 410 forms a continuous ring around the touchscreen 104. As such, the grip sensor 410 can detect a touch at any location on top surface of the frame bezel 500.

Figure 6:
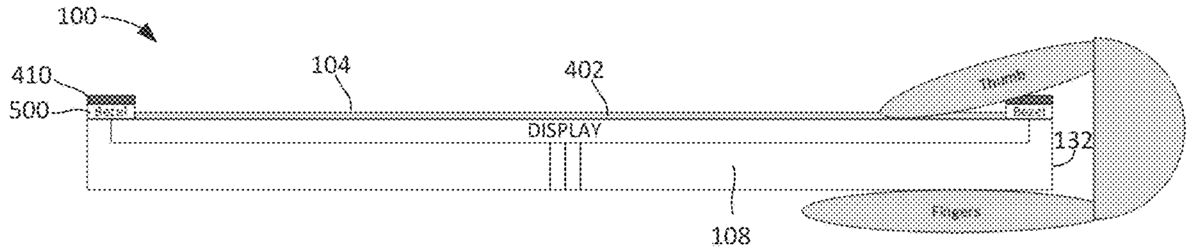
FIG. 6 is a cross-sectional view of the example electronic device of FIG. 5.

FIG. 6 is a cross-sectional view of the electronic device 100 of FIG. 5 showing the grip sensor 410 on the frame bezel 500. As shown in FIG. 6, the person's hand is gripping the second body portion 108 along the second edge 132. This may occur when the person is attempting to fold the electronic device 100. As shown in FIG. 6, a portion of a person's thumb is touching the grip sensor 410 on the frame bezel 500, and a portion of the thumb is touching the touch sensor 402 of the touchscreen 104. In this instance, the grip detection circuitry 412 (FIG. 4) determines, based at least on sensor data from the grip sensor 410, that a person is touching or grasping the frame bezel 500. The grip detection circuitry 412 also determines, based on the sensor data from the grip sensor 410, the location of the touching.

Figure 7:
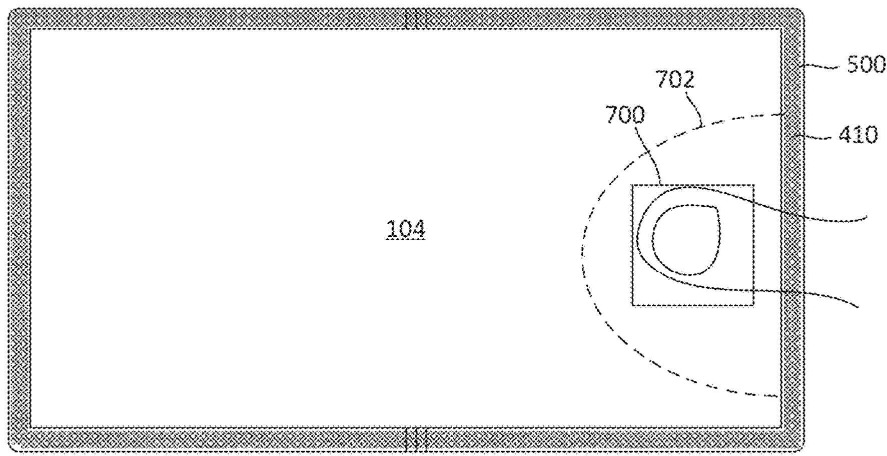
FIG. 7 shows an example in which a hand of a person engages the example bezel and the example touchscreen of the electronic device of FIG. 5.

For example, as shown in FIG. 7, although a person is merely gripping the electronic device 100 with no intention of activating any action or electronic/software function associated with the user interface (UI) displayed on the touchscreen 104, the person's thumb is nonetheless touching the touchscreen 104 at the location of a graphical element 700 of the UI. Traditionally, this touch on the graphical element 700 would cause the electronic device 100 to perform an action or function corresponding to the graphical element 700, such as opening or closing an application. However, because the grip detection circuitry 412 (FIG. 4) detects a touch on the frame bezel 500, the user interface display circuitry 406 (FIG. 4) ignores, rejects, prevents, suppresses, and/or otherwise does not initiate the touch action associated with the touch. Therefore, the user interface display circuitry 406 identifies the touch action as an accidental touch action. In some examples, the user interface display circuitry 406 only ignores or rejects touches on the touchscreen 104 that are near (e.g., adjacent or aligned with) the touch area on the frame bezel 500. For example, the touchscreen detection circuitry 408 (FIG. 4) determines whether the touch occurs within an area 702 that is adjacent the location of the touch detected on the frame bezel 500. If the touchscreen detection circuitry 408 determines the touch occurs within an area 702, the user interface display circuitry 406 ignores, rejects, prevents, suppresses, and/or otherwise does not initiate the touch action which would otherwise be invoked by the touch. However, if a touch occurs outside of the area 702, the user interface display circuitry 406 performs the touch action associated with the touch, since this is likely an intended or purposeful touch action. For example, the person may be performing one or more intentional touch actions with one hand while holding the electronic device 100 with their other hand. Therefore, the user interface display circuitry 406 may simultaneously reject or ignore one or more touch actions while executing one or more other touch actions. In other examples, if a touch is detected at any location on the frame bezel 500, all touches anywhere on the touchscreen 104 are ignored or rejected (e.g., do not invoke a corresponding touch action). In some examples, such as shown in FIG. 7, the area 702 is a semi-circular area defined by a radius from the location of the touch on the frame bezel 500 (e.g., a radius corresponding to the expected length of an adult human thumb (e.g., 35-65 millimeters (mm))). In other examples, the area 702 may be a different shape and/or size and/or the radius may have a different length (e.g., the length of an adult human finger (e.g., 50-100 mm)).

In some examples, as shown in FIGS. 5-7, the grip sensor 410 is a continuous grip sensor disposed around the entire touchscreen 104. In other example, one or more individual or discrete grip sensors are disposed at certain locations on the frame bezel 500. For example, a first grip sensor can be disposed on the frame bezel 500 along the first edge 118 (FIGS. 1 and 2), a second grip sensor can be disposed on the frame bezel 500 along the second edge 132 (FIGS. 1 and 2), etc. In some examples, grip sensor(s) may only be disposed on the frame bezel 500 along certain ones of the edges, such as along the first edge 118 and/or the second edge 132, but not the third edges 122, 134 and/or the fourth edges 124, 136. In some examples, the grip sensor 410 may be disposed below the frame bezel 500. For example, the frame bezel 500 can be constructed of plastic, and the grip sensor 410 can be a capacitive sensor. In such an example, the grip sensor 410 can detect touches on the frame bezel 500.

Figure 8:
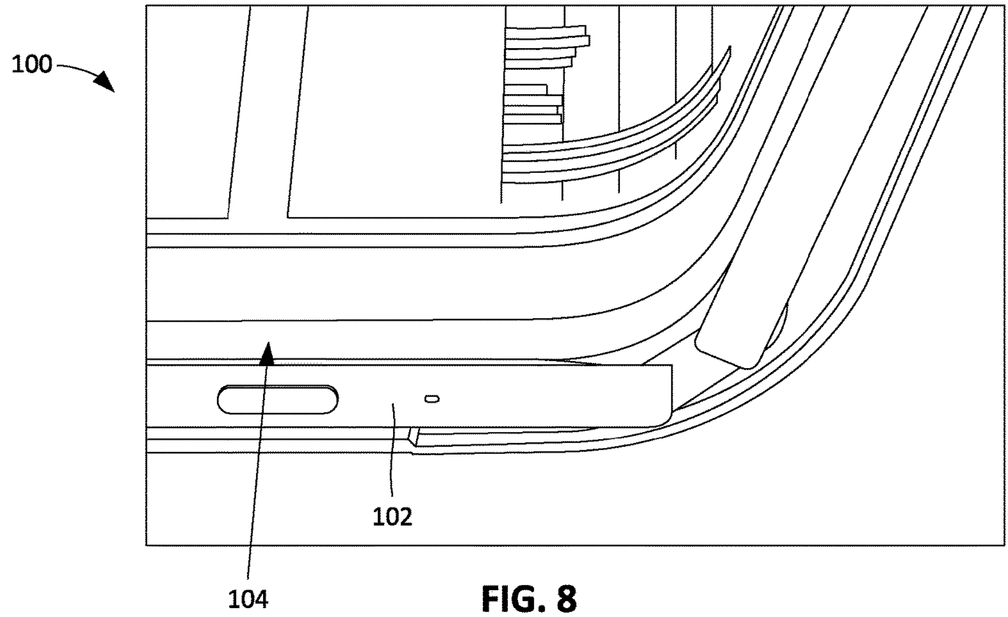
FIG. 8 illustrate an example in which the electronic device of FIG. 1 has little or no frame bezel.
Figure 9:
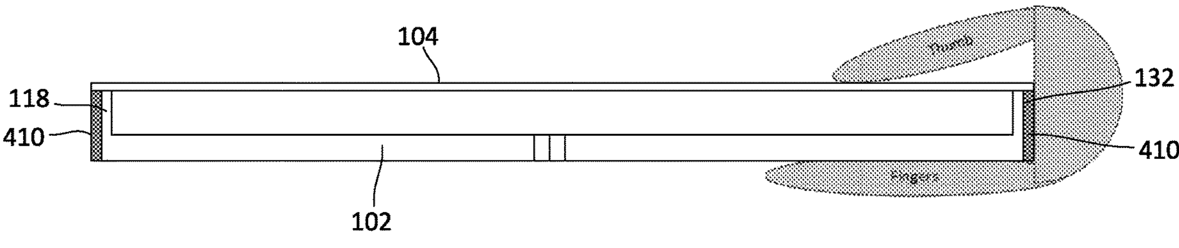
FIG. 9 is a cross-sectional view of the example electronic device of FIG. 8 showing an example grip sensor on an edge of the example electronic device.

In some examples, the touchscreen 104 of the electronic device 100 extends all the way to or close to the edges of the body 102, such that there is little or no physical frame bezel. For example, FIG. 8 shows an example in which the touchscreen 104 extends all the way to the edges of the body 102. This configuration may be desirable to increase (e.g., maximize) screen space. In some examples, the grip sensor 410 can be disposed along one or more edges of the body 102. For example, FIG. 9 is a cross-sectional view of the electronic device 100 of FIG. 8. In this example, the grip sensor 410 is carried by the first and third edges 118, 132 of the body 102. As shown in FIG. 9, the person's hand is contacting the grip sensor 410 along the second edge 132. In such an instance, the grip detection circuitry 412 (FIG. 4) detects this contact, and the user interface display circuitry 406 (FIG. 4) ignores, rejects, prevents, suppresses, and/or otherwise does not initiate a corresponding touch action for any touches that occur(s) on the touchscreen 104 adjacent the location of the contact on the grip sensor 410. Additionally or alternatively, in some examples, the grip sensor 410 can detect a hand or portion of the hand is that hovering or close to the grip sensor 410. In such examples, if the grip detection circuitry 412 detects a hand that is in contact with or close to (e.g., within 5 mm of) the grip sensor 410, the user interface display circuitry 406 can ignore a touch action.

Figure 10:
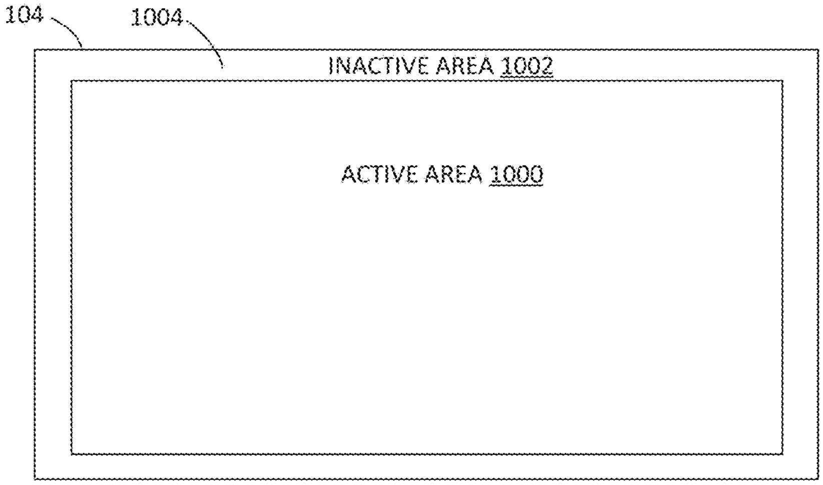
FIG. 10 illustrates the example touchscreen of the example electronic device of FIG. 1 as having an active area and an inactive area that forms a display bezel around the active area.
Figure 11:
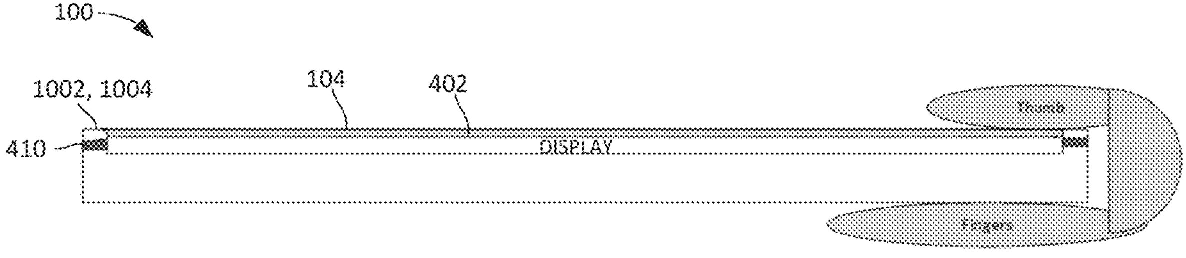
FIG. 11 is a cross-sectional view of the example electronic device of FIG. 1 with the example touchscreen of FIG. 10 and an example grip sensor below the example display bezel.

FIG. 10 shows the touchscreen 104. As described above, in some examples, the touchscreen 104 may extend all the way to or close to the edges of the body 102. In some such examples, the touchscreen 104 has an active area 1000 and an inactive area 1002 around the active area 1000. The active area 1000 displays content, but the inactive area 1002 does not display any content. This inactive area 1002 forms a display bezel 1004 around the active area 1000. In some examples, the grip sensor 410 is disposed below the display bezel 1004 (i.e., below the inactive area 1002). For example, FIG. 11 is a cross-sectional view of the electronic device 100 having the touchscreen of FIG. 10. As shown in FIG. 11, the grip sensor 410 is disposed below the display bezel 1004 of the touchscreen 104. Similar to the examples disclosed above, if the grip detection circuitry 412 detects a touch on the display bezel 1004, the user interface display circuitry 406 ignores, rejects, prevents, suppresses, and/or otherwise does not initiate a corresponding touch action for touches occurring at or near the location of the touch on the inactive area 1002. In some examples, the grip sensor 410 is a separate sensor apart from the touch sensor 402 on the touchscreen 104. However, in other examples, the portion of the touch sensor 402 on the inactive area 1002 of the touchscreen 104 can be utilized as the grip sensor 410.

In some examples, the grip sensor 410 may be disposed on multiple sides or surfaces of the body 102. For example, the grip sensor 410 may be disposed on the frame bezel 500, on the edges 118, 122, 124, 132, 134, 136, and/or on the bottom sides 116, 128. In some examples, the user interface display circuitry 406 only ignores, rejects, prevents, suppresses, and/or otherwise does not initiate a corresponding touch action for a touch if the grip detection circuitry 412 detects contact on multiple sides or edges of the body 102. This approach helps distinguish between when a person is merely holding one or two sides of the electronic device 100 and when the person is actually gripping the electronic device 100 during a folding or unfolding operation. For example, if the grip detection circuitry 412 detects contact on the second edge 132, the frame bezel 500 along the second edge 132, and the bottom side 128 along the second edge 132, the user interface display circuitry 406 ignores or rejects a touch action occurring at or near the location of the contact. However, if contact only occurs at one or two of these locations, the user interface display circuitry 406 may activate and/or permit the touch action.

Figure 12:
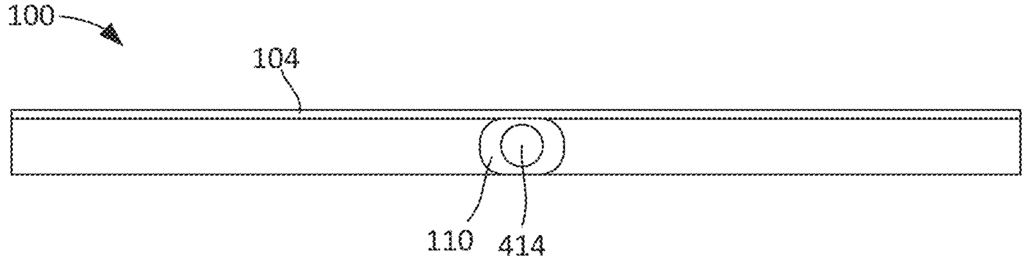
FIG. 12 is a side view of the example electronic device of FIG. 1 showing an example hinge sensor.

In other examples, in addition to or as an alternative to the grip sensor 410, the electronic device 100 may include one or more sensors to determine whether the electronic device 100 is being folded or unfolded and ignore touch actions. Referring briefly back to FIG. 4, the electronic device can include one or more motion sensors 414. For example, FIG. 12 is a side view of the example electronic device 100 showing the example hinge 110. The motion sensor 414 is coupled to and/or otherwise integrated with the hinge 110. In this example, the motion sensor 414 is a hinge angle sensor. The hinge angle sensor measures or senses an angle or position of the hinge 110. Based on sensor data from the motion sensor 414, the motion detection circuitry 416 (FIG. 4) determines whether the electronic device 100 is in the process of being folded or unfolded. For example, the motion detection circuitry 416 can determine if the body 102 is in the process of being folded or unfolded based on a change in the angle or position of the hinge 110. The change must be more than a de minimis amount (e.g., more than 2 degrees). If the motion detection circuitry 416 determines the electronic device 100 is being folded or unfolded, and the touchscreen detection circuitry 408 (FIG. 4) detects a touch action, the user interface display circuitry 406 (FIG. 4) ignores, rejects, prevents, suppresses, and/or otherwise does not initiate the touch action(s) corresponding to the touch. In such circumstances, the user interface display circuitry 406 ignores, rejects, prevents, suppresses, and/or otherwise does not initiate touch actions corresponding to touches occurring anywhere on the touchscreen 104. This reduces or prevents the person from accidentally invoking actions via the touchscreen 104 while folding/unfolding the electronic device 100.

Figure 13:
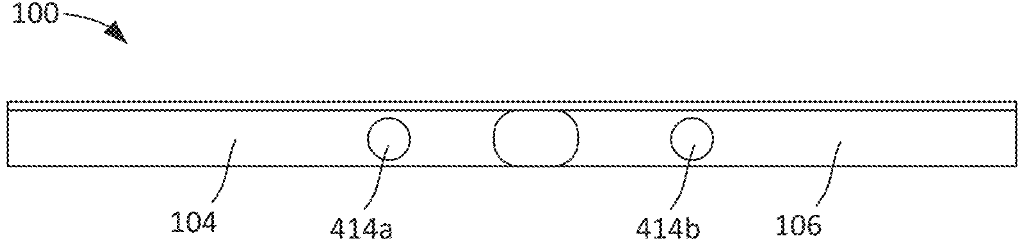
FIG. 13 is a side view of the example electronic device of FIG. 1 showing example accelerometers.

In other examples, the motion sensor 414 may be implemented as one or more accelerometers. For example, FIG. 13 shows an example in which the electronic device 100 includes a first accelerometer 414*a* and a second accelerometer 414*b*. The first accelerometer 414*a* is carried by (e.g., disposed in) in the first body portion 106 and the second accelerometer 414*b* is carried by (e.g., disposed in) the second body portion 108. The first and second accelerometers 414*a*, 414*b* measure or sense acceleration (motion) in the first and second body portions 106, 108, respectively. The motion detection circuitry 416 (FIG. 4) determines if the electronic device 100 is being folded or unfolded based on sensor data from first and second accelerometers 414*a*, 414*b*. In some examples, the motion detection circuitry 416 uses sensor data from the first and second accelerometers 414*a*, 414*b* to determine (e.g., calculate) a hinge angle. If the hinge angle is changing, the motion detection circuitry 416 determines the electronic device 100 is being folded or unfolded. If the motion detection circuitry 416 determines the electronic device 100 is being folded or unfolded, and the touchscreen detection circuitry 408 (FIG. 4) detects a touch on the touchscreen 104, the user interface display circuitry 406 (FIG. 4) ignores, rejects, prevents, suppresses, and/or otherwise does not initiate the touch action(s) corresponding to the touch. This reduces or prevents the person from accidentally causing actions on the touchscreen 104 while folding/unfolding the electronic device 100. While in this example two accelerometers are used, in other examples only one accelerometer may be used. In another example, the motion sensor 414 can be implemented as a camera of the electronic device 100. Camera data, such as video feed, can be used to determine the electronic device 100 is being folded or unfolded. For example, the motion detection circuitry 416 can determine if the electronic device 100 is being folded or unfolded based on the changing landscape and/or rate of change in the video feed from the camera.

In some examples, input from the grip sensor 410 and the motion sensor 414 may be used in combination to determine whether to ignore, reject, prevent, suppress, and/or otherwise not initiate a touch action. For example, if the grip detection circuitry 412 detects gripping on the frame bezel 500 (or another location associated with the grip sensor 410), and the motion detection circuitry 416 determines electronic device 100 is being folded or unfolded, the user interface display circuitry 406 ignores, rejects, prevents, suppresses, and/or otherwise does not initiate any touch action corresponding to touch(es) on the touchscreen 104. In other examples, the user interface display circuitry 406 may still perform certain touch actions corresponding to touches occurring outside of a threshold distance from the location of the touch on the grip sensor 410. Therefore, in some examples, two inputs may be required before ignoring or rejecting a touch action. This can be determined by an AND logic operation performed on the two inputs. This improves accuracy and provides greater confidence that the touch action is accidental.

While some of the example systems and methods disclosed herein are described in connection with a tablet having a foldable touchscreen, the example systems and methods disclosed herein can similarly be implemented in connection with other types of electronic devices having a touchscreen, including devices that have only one display and/or a display that does not fold. For example, the example systems and methods disclosed herein can be implemented in connection with a laptop computer, which has a keyboard carried on one body portion (e.g., a base such as the first body portion 106) and a touchscreen carried on another body portion (e.g., a lid such as the second body portion 108). In other example, the systems and methods disclosed herein can be implemented in connection with a smartphone. Examples disclosed herein can also be implemented in connection with devices having dual displays, such as a dual display personal computer (PC) or a smartphone having separate rigid displays on either side of the hinge.

While an example manner of implementing the user interface control system 404 is illustrated in FIG. 4, one or more of the elements, processes, and/or devices illustrated in FIG. 4 may be combined, divided, re-arranged, omitted, eliminated, and/or implemented in any other way. Further, the example user interface display circuitry 406, the example touchscreen detection circuitry 408, the example grip detection circuitry 412, the example motion detection circuitry 416, and/or, more generally, the example user interface control system 404 of FIG. 4, may be implemented by hardware alone or by hardware in combination with software and/or firmware. Thus, for example, any of the example user interface display circuitry 406, the example touchscreen detection circuitry 408, the example grip detection circuitry 412, the example motion detection circuitry 416, and/or, more generally, the example user interface control system 404, could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit (s) (ASIC(s)), programmable logic device(s) (PLD(s)), and/or field programmable logic device(s) (FPLD(s)) such as Field Programmable Gate Arrays (FPGAs). Further still, the example user interface control system 404 of FIG. 4 may include one or more elements, processes, and/or devices in addition to, or instead of, those illustrated in FIG. 4, and/or may include more than one of any or all of the illustrated elements, processes and devices.

Figure 14:
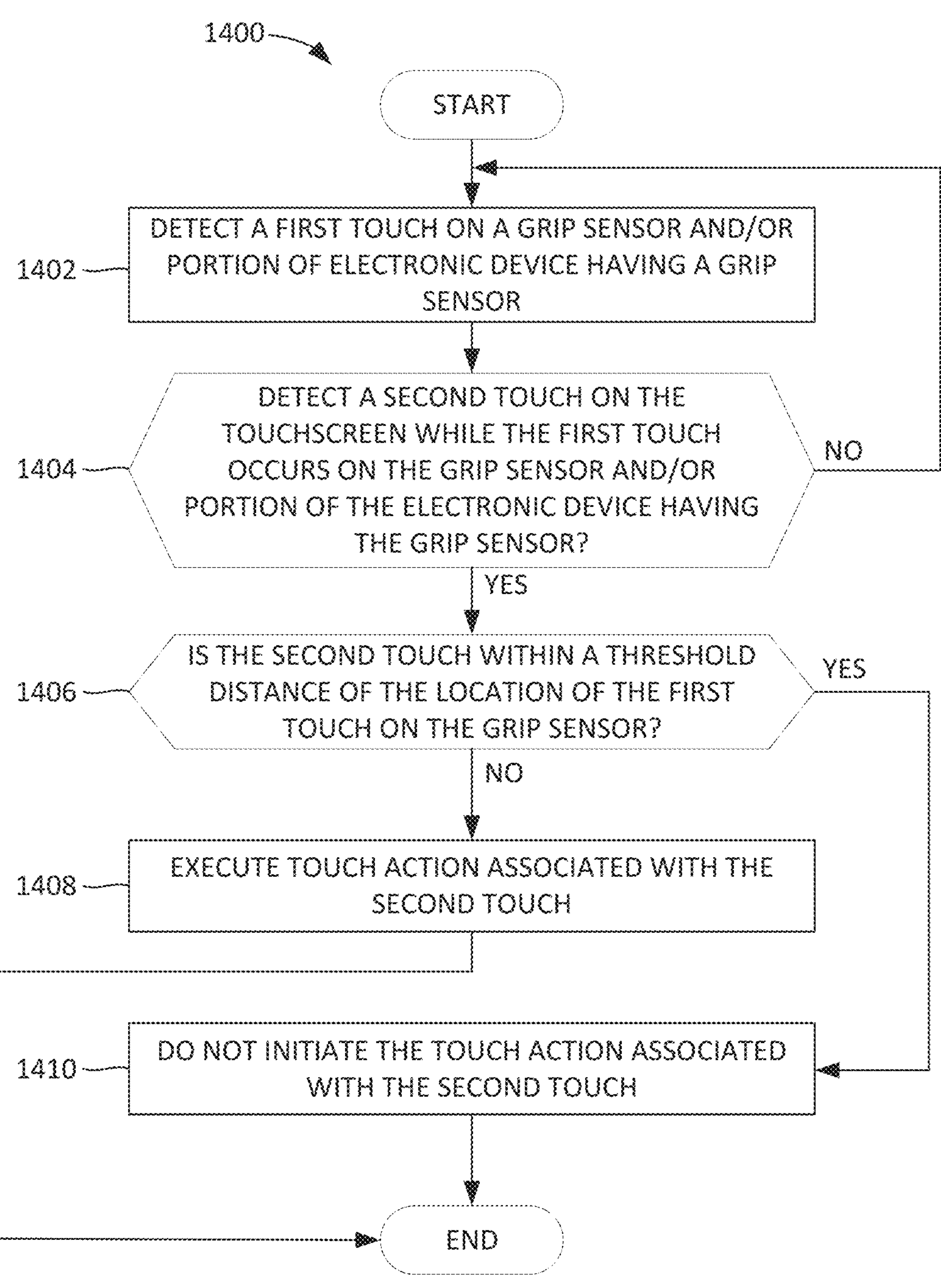
FIG. 14 is a flowchart representative of example machine readable instructions and/or example operations that may be executed by example processor circuitry to implement the example user interface control system of FIG. 4.
Figure 15:
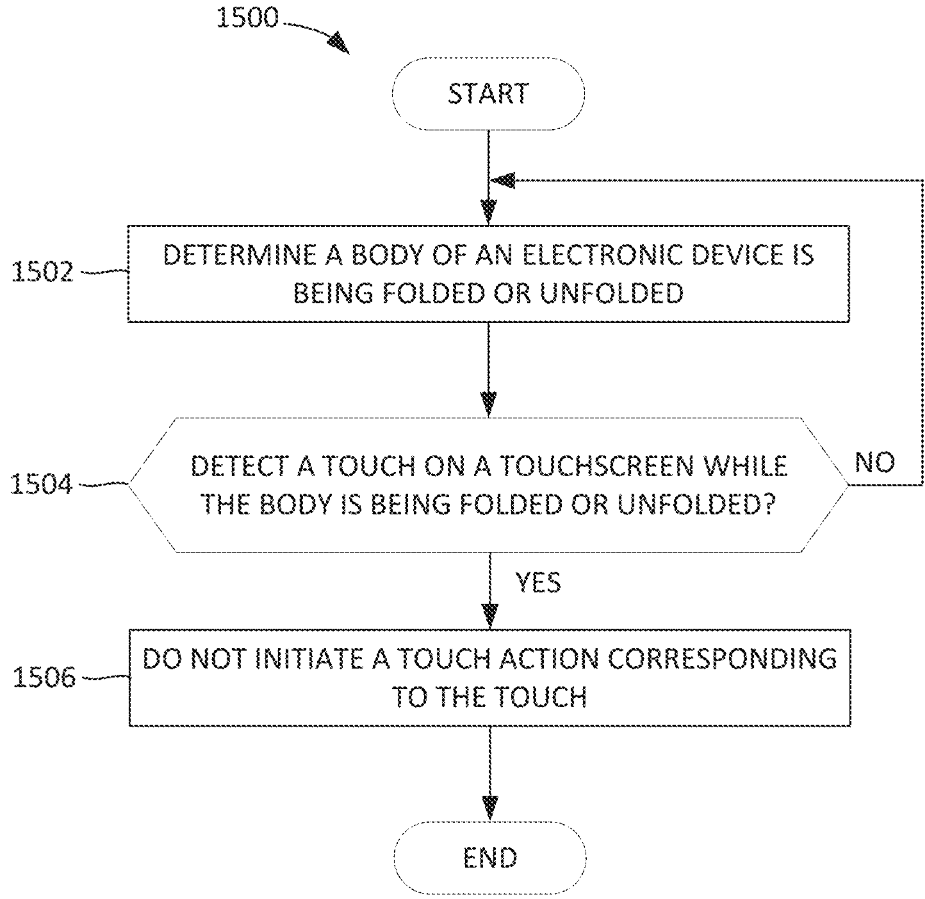
FIG. 15 is another flowchart representative of example machine readable instructions and/or example operations that may be executed by example processor circuitry to implement the example user interface control system of FIG. 4.

Flowcharts representative of example machine readable instructions, which may be executed to configure processor circuitry to implement the user interface control system 404 of FIG. 4, are shown in FIGS. 14 and 15. The machine readable instructions may be one or more executable programs or portion(s) of an executable program for execution by processor circuitry, such as the processor circuitry 1612 shown in the example processor platform 1600 discussed below in connection with FIG. 16 and/or the example processor circuitry discussed below in connection with FIGS. 17 and/or 18. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 14 and 15, many other methods of implementing the example user interface control system 404 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 14 and 15 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 14 is a flowchart representative of example machine readable instructions and/or example operations 1400 that may be executed and/or instantiated by processor circuitry to ignore, reject, prevent, suppress, and/or otherwise not initiate one or more touch actions on the electronic device 100. The machine readable instructions and/or the operations 1400 of FIG. 14 begin at block 1402, at which the grip detection circuitry 412 detects, based on sensor data from the grip sensor 410, a first touch or grip on the grip sensor 410 and/or on a portion of the electronic device 100 having the grip sensor 410. Such a touch may occur while a person is gripping one or more sides or edges of the electronic device 100 to fold or unfold the electronic device 100. The grip detection circuitry 412 also identifies the location of the first touch. As disclosed above in connection with FIGS. 5-11, the grip sensor 410 can be disposed one or more sides or edges of the body 102, such as on the frame bezel 500, on the edges 118, 122, 124, 132, 134, 136, and/or on the bottom sides 116, 128. Additionally or alternatively, the grip sensor 410 may be disposed below a surface, such as below the display bezel 1004 of the touchscreen 104.

At block 1404, the touchscreen detection circuitry 408 detects or determines whether a second touch occurs on the touchscreen 104 while the first touch occurs on the grip sensor 410 and/or on the portion of the electronic device 100 having the grip sensor 410. If a second touch does not occur on the touchscreen 104 at the same time as the first touch on the grip sensor 410 and/or on the portion of the electronic device having the grip sensor 410, the example process repeats and continues to wait for an instance of simultaneous touching. If the touchscreen detection circuitry 408 detects a second touch on the touchscreen 104 while the first touch occurs on the grip sensor 410 and/or on the portion of the electronic device 100 having the grip sensor 410 (e.g., on the display bezel 1004), control proceeds to block 1406. At block 1406, the touchscreen detection circuitry 408 determines whether the second touch is within a threshold distance of the location of the first touch on the grip sensor 410 and/or the portion of the electronic device 100 having the grip sensor 410. The threshold distance may be any distance, such as one or two inches. The threshold distance may be defined by a radius from the location of the first touch on the grip sensor 410 or the portion of the electronic device 100 having the grip sensor 410. If the second touch is not within the threshold distance of the location of the first touch on the grip sensor 410 and/or the portion of the electronic device 100 having the grip sensor 410, the user interface display circuitry 406, at block 1408, executes the touch action (e.g., function, command, etc.) associated with the second touch on the touchscreen 104, such as opening a web browser, scrolling, changing screens, etc.

If the second touch is within the threshold distance of the location of the first touch on the grip sensor 410 and/or the portion of the electronic device 100 having the grip sensor 410 (e.g., the display bezel 1004), the user interface display circuitry 406, at block 1410, ignores, rejects, prevents, suppresses, and/or otherwise does not initiate the touch action. In particular, the user interface display circuitry 406 ignores, rejects, prevents, suppresses, and/or otherwise does not initiate the touch action associated with the second touch occurring on the touchscreen 104. Therefore, the user interface display circuitry 406 does not initiate a touch action associated with the second touch due to the first touch on the grip sensor 410 and/or portion of the electronic device 100 having the grip sensor 410. As such, the example process reduces or prevents accidental touch actions that may be triggered while the person is folding or unfolding the electronic device 100.

In some examples, the operations of blocks 1404-1410 are executed or repeated numerous times as multiple touches (e.g., simultaneous touches) on the touchscreen 104 occur while there is touching on the grip sensor 410 and/or the portion of the electronic device 100 having the grip sensor 410. For example, the person may be gripping the electronic device 100 with their right hand while using their left hand to select a graphical user element on the touchscreen 104. Their right hand may accidentally touch one or more areas on the touchscreen 104. These touch(es) may be within the threshold distance and are therefore ignored. However, the touch(es) from the left hand is/are outside of the distance threshold and therefore the touch action(s) is/are executed. Therefore, there may be multiple touches that occur in sequence or simultaneously.

In some examples, the user interface control system 404 may only ignores, rejects, prevents, suppresses, and/or otherwise does not initiate touch actions if the grip sensor 410 detects contact in two locations. For example, when a person folds the electronic device 100, the person may grasp the body 102 along the first and second edges 118, 132. Therefore, in some examples, the user interface control system 404 only ignores, rejects, prevents, suppresses, and/or otherwise does not initiate touch actions if the grip sensor 410 detects touching on the body 102 at or near the first and second edges 118, 132 (e.g., on the first and second edges 118, 132, on the frame bezel 500 along the first and second edges 118, 132, on the bottom sides 116, 128 along the first and second edges 118, 132, etc.).

FIG. 15 is a flowchart representative of example machine readable instructions and/or example operations 1500 that may be executed and/or instantiated by processor circuitry to ignore, reject, prevent, suppress, and/or otherwise not initiate one or more touch actions on the electronic device 100. The machine readable instructions and/or the operations 1500 of FIG. 15 begin at block 1502, at which the motion detection circuitry 416 determines the body 102 of the electronic device 100 is being folded or unfolded. In some examples, the motion detection circuitry 416 determines the body 102 is being folded or unfolded based on data from one or more sensors, such as the motion sensor 414. In some examples, the motion sensor 414 includes a hinge angle sensor, such as shown in FIG. 12. Additionally or alternatively, the motion sensor 414 includes one or more accelerometers, such as the first and second accelerometers **414*a*, 414*b* of FIG. 13. Additionally or alternatively, the motion sensor 414 includes a camera of the electronic device 100. For example, the motion detection circuitry 416 can detect a rotation of the electronic device 100 based on camera data (e.g., video feed) from the camera, which can be used to determine the electronic device 100** is being folded or unfolded.

At block 1504, the touchscreen detection circuitry 408 detects or determines whether a touch occurs on the touchscreen 104 while the electronic device 100 is being folded or unfolded. If a touch does not occur on the touchscreen 104 while the electronic device 100 is being folded or unfolded, the example process repeats and continues to wait. If the touchscreen detection circuitry 408 detects a touch on the touchscreen 104 while the electronic device 100 is being folded or unfolded, control proceeds to block 1506. At block 1506, the user interface display circuitry 406 ignores, rejects, prevents, suppresses, and/or otherwise does not initiate the touch action corresponding to the touch based at least in part on the determination the body 102 is being folded or unfolded. As such, the example process reduces or prevents accidental actions that may be triggered while a person is folding or unfolding the electronic device 100.

Figure 16:
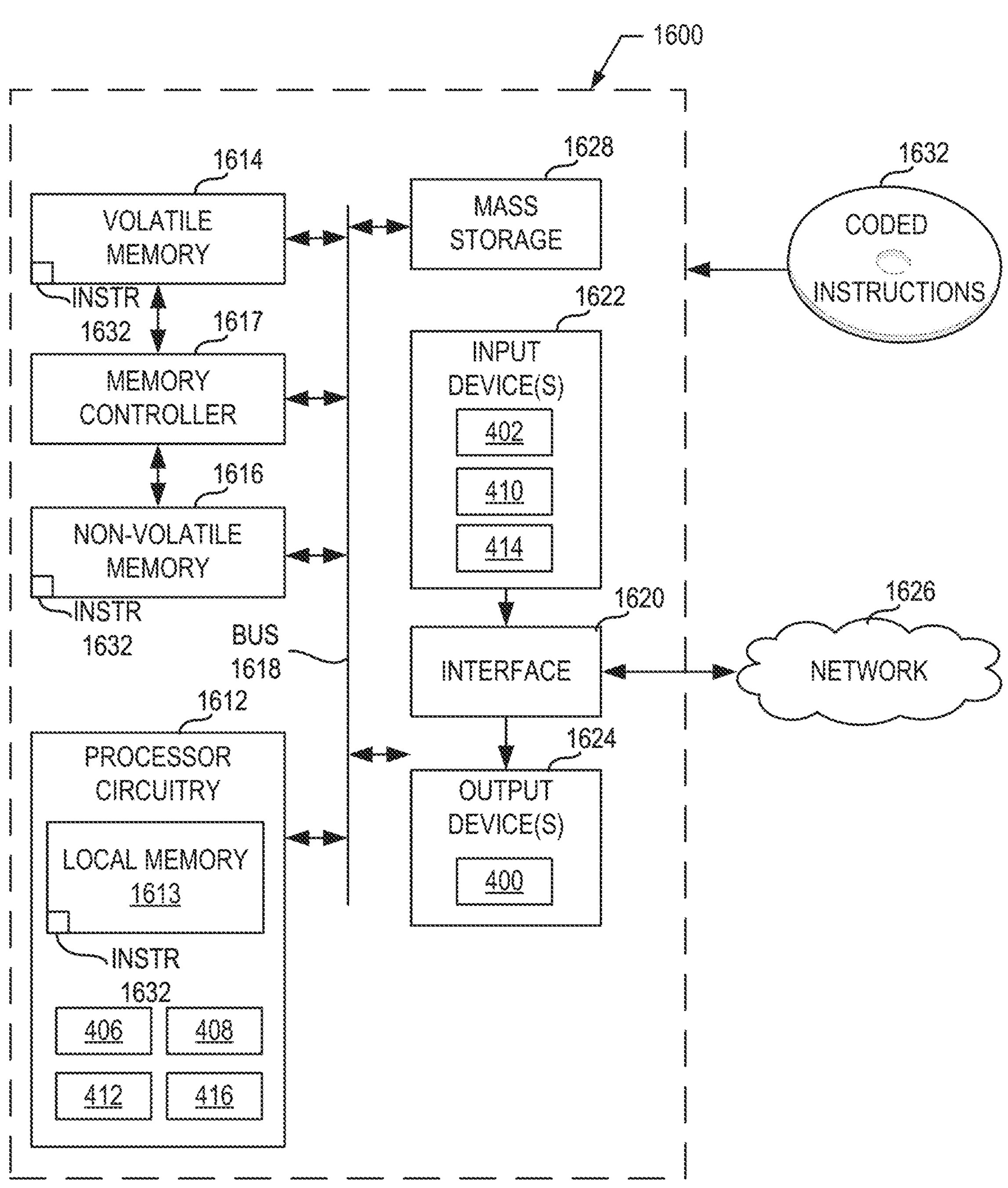
FIG. 16 is a block diagram of an example processing platform including processor circuitry structured to execute the example machine readable instructions and/or the example operations of FIGS. 14 and 15 to implement the example user interface control system of FIG. 4.

FIG. 16 is a block diagram of an example processor platform 1600 structured to execute and/or instantiate the machine readable instructions and/or the operations of FIGS. 14 and 15 to implement the user interface control system 404 of FIG. 4. The processor platform 1600 can be, for example, a server, a personal computer (e.g., a desktop computer, a laptop computer, a tablet, etc.), a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1600 of the illustrated example includes processor circuitry 1612. The processor circuitry 1612 of the illustrated example is hardware. For example, the processor circuitry 1612 can be implemented by one or more integrated circuits, logic circuits, FPGAs, microprocessors, CPUs, GPUs, DSPs, and/or microcontrollers from any desired family or manufacturer. The processor circuitry 1612 may be implemented by one or more semiconductor based (e.g., silicon based) devices. In this example, the processor circuitry 1612 implements the user interface display circuitry 406, the touchscreen detection circuitry 408, the grip detection circuitry 412, and the motion detection circuitry 416.

The processor circuitry 1612 of the illustrated example includes a local memory 1613 (e.g., a cache, registers, etc.). The processor circuitry 1612 of the illustrated example is in communication with a main memory including a volatile memory 1614 and a non-volatile memory 1616 by a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1616 may be implemented by flash memory and/or any other desired type of memory device. Access to the main memory 1614, 1616 of the illustrated example is controlled by a memory controller 1617.

The processor platform 1600 of the illustrated example also includes interface circuitry 1620. The interface circuitry 1620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1622 are connected to the interface circuitry 1620. The input device(s) 1622 permit(s) a user and/or device to enter data and/or commands into the processor circuitry 1612. For example, the input device(s) 1622 can include the touch sensor 402 of the touchscreen 104, the grip sensor 410, and the motion sensor 414. Additionally or alternatively, the input device(s) 1622 can be implemented by, for example, an audio sensor, a microphone, a camera (still or video), a keyboard, a button, a mouse, a track-pad, a trackball, an isopoint device, and/or a voice recognition system.

One or more output devices 1624 are also connected to the interface circuitry 1620 of the illustrated example. The output device(s) 424 can be implemented, for example, by display devices such as the display 400 of the touchscreen 104 (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1620 of the illustrated example, thus, typically includes a graphics driver card, a graphics driver chip, and/or graphics processor circuitry such as a GPU.

The interface circuitry 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1600 of the illustrated example also includes one or more mass storage devices 1628 to store software and/or data. Examples of such mass storage devices 1628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1632, which may be implemented by the machine readable instructions of FIGS. 14 and 15, may be stored in the mass storage device 1628, in the volatile memory 1614, in the non-volatile memory 1616, and/or on a removable non-transitory computer readable storage medium such as a CD or DVD.

Figure 17:
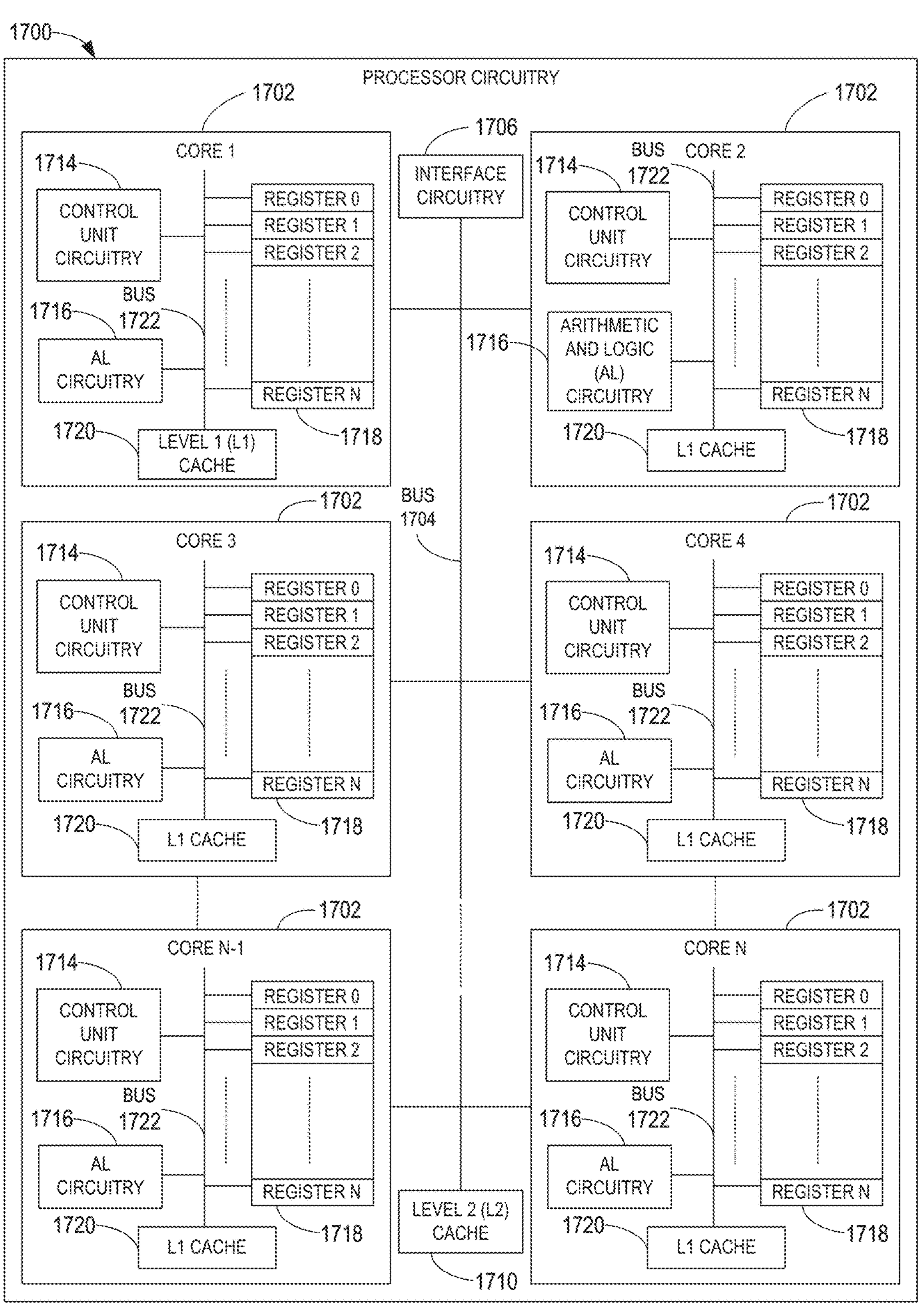
FIG. 17 is a block diagram of an example implementation of the processor circuitry of FIG. 16.

FIG. 17 is a block diagram of an example implementation of the processor circuitry 1612 of FIG. 16. In this example, the processor circuitry 1612 of FIG. 16 is implemented by a microprocessor 1700. For example, the microprocessor 1700 may be a general purpose microprocessor (e.g., general purpose microprocessor circuitry). The microprocessor 1700 executes some or all of the machine readable instructions of the flowcharts of FIGS. 14 and 15 to effectively instantiate the circuitry of FIG. 4 as logic circuits to perform the operations corresponding to those machine readable instructions. In some such examples, the circuitry of FIG. 4 is instantiated by the hardware circuits of the microprocessor 1700 in combination with the instructions. For example, the microprocessor 1700 may be implemented by multi-core hardware circuitry such as a CPU, a DSP, a GPU, an XPU, etc. Although it may include any number of example cores 1702 (e.g., 1 core), the microprocessor 1700 of this example is a multi-core semiconductor device including N cores. The cores 1702 of the microprocessor 1700 may operate independently or may cooperate to execute machine readable instructions. For example, machine code corresponding to a firmware program, an embedded software program, or a software program may be executed by one of the cores 1702 or may be executed by multiple ones of the cores 1702 at the same or different times. In some examples, the machine code corresponding to the firmware program, the embedded software program, or the software program is split into threads and executed in parallel by two or more of the cores 1702. The software program may correspond to a portion or all of the machine readable instructions and/or operations represented by the flowcharts of FIGS. 14 and 15.

The cores 1702 may communicate by a first example bus 1704. In some examples, the first bus 1704 may be implemented by a communication bus to effectuate communication associated with one(s) of the cores 1702. For example, the first bus 1704 may be implemented by at least one of an Inter-Integrated Circuit (I2C) bus, a Serial Peripheral Interface (SPI) bus, a PCI bus, or a PCIe bus. Additionally or alternatively, the first bus 1704 may be implemented by any other type of computing or electrical bus. The cores 1702 may obtain data, instructions, and/or signals from one or more external devices by example interface circuitry 1706. The cores 1702 may output data, instructions, and/or signals to the one or more external devices by the interface circuitry 1706. Although the cores 1702 of this example include example local memory 1720 (e.g., Level 1 (L1) cache that may be split into an L1 data cache and an L1 instruction cache), the microprocessor 1700 also includes example shared memory 1710 that may be shared by the cores (e.g., Level 2 (L2 cache)) for high-speed access to data and/or instructions. Data and/or instructions may be transferred (e.g., shared) by writing to and/or reading from the shared memory 1710. The local memory 1720 of each of the cores 1702 and the shared memory 1710 may be part of a hierarchy of storage devices including multiple levels of cache memory and the main memory (e.g., the main memory 1614, 1616 of FIG. 16). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1702 may be referred to as a CPU, DSP, GPU, etc., or any other type of hardware circuitry. Each core 1702 includes control unit circuitry 1714, arithmetic and logic (AL) circuitry (sometimes referred to as an ALU) 1716, a plurality of registers 1718, the local memory 1720, and a second example bus 1722. Other structures may be present. For example, each core 1702 may include vector unit circuitry, single instruction multiple data (SIMD) unit circuitry, load/store unit (LSU) circuitry, branch/jump unit circuitry, floating-point unit (FPU) circuitry, etc. The control unit circuitry 1714 includes semiconductor-based circuits structured to control (e.g., coordinate) data movement within the corresponding core 1702. The AL circuitry 1716 includes semiconductor-based circuits structured to perform one or more mathematic and/or logic operations on the data within the corresponding core 1702. The AL circuitry 1716 of some examples performs integer based operations. In other examples, the AL circuitry 1716 also performs floating point operations. In yet other examples, the AL circuitry 1716 may include first AL circuitry that performs integer based operations and second AL circuitry that performs floating point operations. In some examples, the AL circuitry 1716 may be referred to as an Arithmetic Logic Unit (ALU). The registers 1718 are semiconductor-based structures to store data and/or instructions such as results of one or more of the operations performed by the AL circuitry 1716 of the corresponding core 1702. For example, the registers 1718 may include vector register(s), SIMD register(s), general purpose register(s), flag register(s), segment register(s), machine specific register(s), instruction pointer register(s), control register(s), debug register(s), memory management register(s), machine check register(s), etc. The registers 1718 may be arranged in a bank as shown in FIG. 17. Alternatively, the registers 1718 may be organized in any other arrangement, format, or structure including distributed throughout the core 1702 to shorten access time. The second bus 1722 may be implemented by at least one of an I2C bus, a SPI bus, a PCI bus, or a PCIe bus Each core 1702 and/or, more generally, the microprocessor 1700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 18:
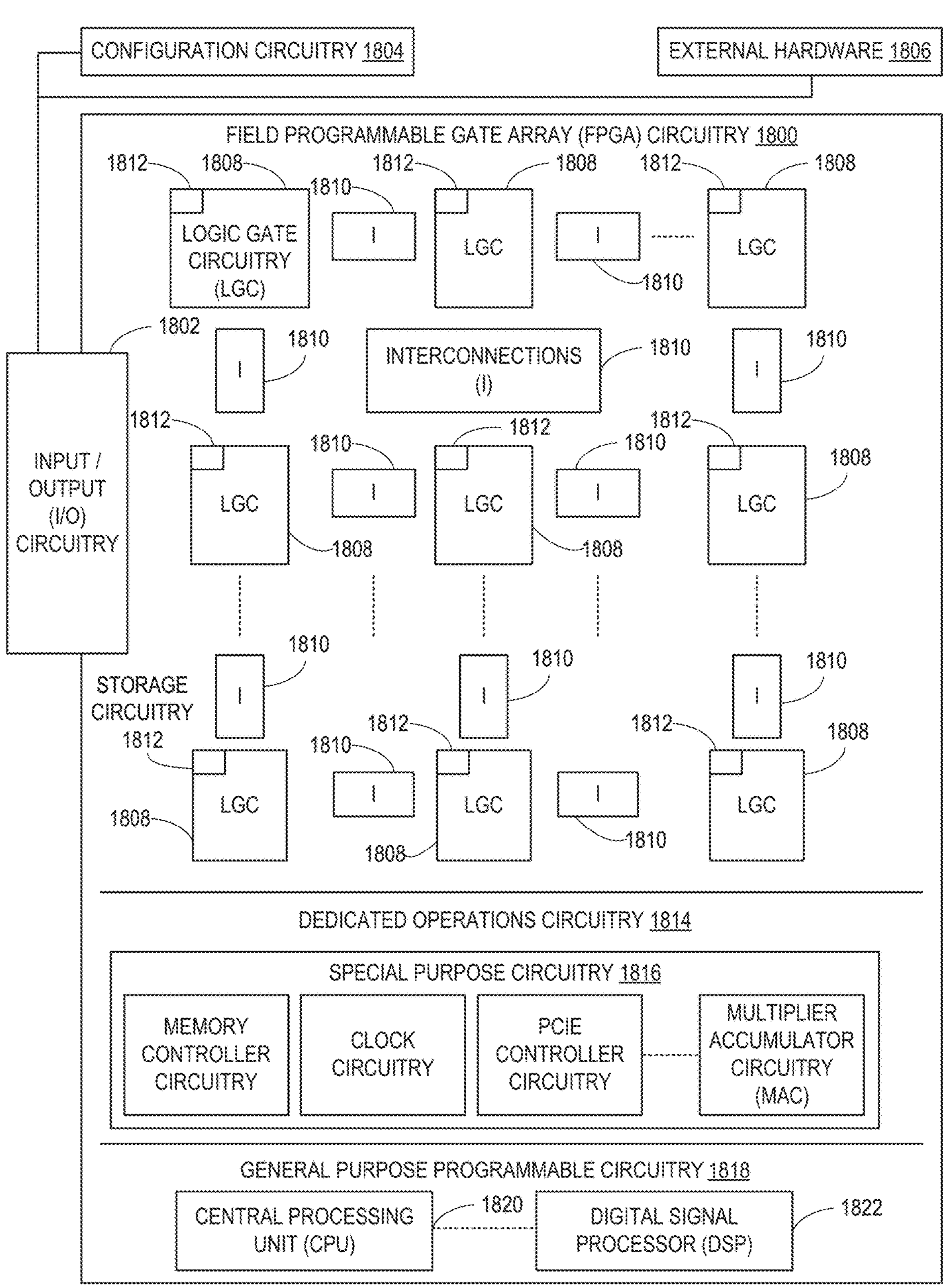
FIG. 18 is a block diagram of another example implementation of the processor circuitry of FIG. 16.

FIG. 18 is a block diagram of another example implementation of the processor circuitry 1612 of FIG. 16. In this example, the processor circuitry 1612 is implemented by FPGA circuitry 1800. For example, the FPGA circuitry 1800 may be implemented by an FPGA. The FPGA circuitry 1800 can be used, for example, to perform operations that could otherwise be performed by the example microprocessor 1700 of FIG. 17 executing corresponding machine readable instructions. However, once configured, the FPGA circuitry 1800 instantiates the machine readable instructions in hardware and, thus, can often execute the operations faster than they could be performed by a general purpose microprocessor executing the corresponding software.

More specifically, in contrast to the microprocessor 1700 of FIG. 17 described above (which is a general purpose device that may be programmed to execute some or all of the machine readable instructions represented by the flowcharts of FIGS. 14 and 15 but whose interconnections and logic circuitry are fixed once fabricated), the FPGA circuitry 1800 of the example of FIG. 18 includes interconnections and logic circuitry that may be configured and/or interconnected in different ways after fabrication to instantiate, for example, some or all of the machine readable instructions represented by the flowcharts of FIGS. 14 and 15. In particular, the FPGA circuitry 1800 may be thought of as an array of logic gates, interconnections, and switches. The switches can be programmed to change how the logic gates are interconnected by the interconnections, effectively forming one or more dedicated logic circuits (unless and until the FPGA circuitry 1800 is reprogrammed). The configured logic circuits enable the logic gates to cooperate in different ways to perform different operations on data received by input circuitry. Those operations may correspond to some or all of the software represented by the flowcharts of FIGS. 14 and 15. As such, the FPGA circuitry 1800 may be structured to effectively instantiate some or all of the machine readable instructions of the flowcharts of FIGS. 14 and 15 as dedicated logic circuits to perform the operations corresponding to those software instructions in a dedicated manner analogous to an ASIC. Therefore, the FPGA circuitry 1800 may perform the operations corresponding to the some or all of the machine readable instructions of FIGS. 14 and 15 faster than the general purpose microprocessor can execute the same.

In the example of FIG. 18, the FPGA circuitry 1800 is structured to be programmed (and/or reprogrammed one or more times) by an end user by a hardware description language (HDL) such as Verilog. The FPGA circuitry 1800 of FIG. 18, includes example input/output (I/O) circuitry 1802 to obtain and/or output data to/from example configuration circuitry 1804 and/or external hardware 1806. For example, the configuration circuitry 1804 may be implemented by interface circuitry that may obtain machine readable instructions to configure the FPGA circuitry 1800, or portion(s) thereof. In some such examples, the configuration circuitry 1804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1806 may be implemented by external hardware circuitry. For example, the external hardware 1806 may be implemented by the microprocessor 1700 of FIG. 17. The FPGA circuitry 1800 also includes an array of example logic gate circuitry 1808, a plurality of example configurable interconnections 1810, and example storage circuitry 1812. The logic gate circuitry 1808 and the configurable interconnections 1810 are configurable to instantiate one or more operations that may correspond to at least some of the machine readable instructions of FIGS. 14 and 15 and/or other desired operations. The logic gate circuitry 1808 shown in FIG. 18 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1808 to enable configuration of the electrical structures and/or the logic gates to form circuits to perform desired operations. The logic gate circuitry 1808 may include other electrical structures such as look-up tables (LUTs), registers (e.g., flip-flops or latches), multiplexers, etc.

The configurable interconnections 1810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1808 to program desired logic circuits.

The storage circuitry 1812 of the illustrated example is structured to store result(s) of the one or more of the operations performed by corresponding logic gates. The storage circuitry 1812 may be implemented by registers or the like. In the illustrated example, the storage circuitry 1812 is distributed amongst the logic gate circuitry 1808 to facilitate access and increase execution speed.

The example FPGA circuitry 1800 of FIG. 18 also includes example Dedicated Operations Circuitry 1814. In this example, the Dedicated Operations Circuitry 1814 includes special purpose circuitry 1816 that may be invoked to implement commonly used functions to avoid the need to program those functions in the field. Examples of such special purpose circuitry 1816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1800 may also include example general purpose programmable circuitry 1818 such as an example CPU 1820 and/or an example DSP 1822. Other general purpose programmable circuitry 1818 may additionally or alternatively be present such as a GPU, an XPU, etc., that can be programmed to perform other operations.

Although FIGS. 17 and 18 illustrate two example implementations of the processor circuitry 1612 of FIG. 16, many other approaches are contemplated. For example, as mentioned above, modern FPGA circuitry may include an on-board CPU, such as one or more of the example CPU 1820 of FIG. 18. Therefore, the processor circuitry 1612 of FIG. 16 may additionally be implemented by combining the example microprocessor 1700 of FIG. 17 and the example FPGA circuitry 1800 of FIG. 18. In some such hybrid examples, a first portion of the machine readable instructions represented by the flowcharts of FIGS. 14 and 15 may be executed by one or more of the cores 1702 of FIG. 17, a second portion of the machine readable instructions represented by the flowcharts of FIGS. 14 and 15 may be executed by the FPGA circuitry 1800 of FIG. 18, and/or a third portion of the machine readable instructions represented by the flowcharts of FIGS. 14 and 15 may be executed by an ASIC. It should be understood that some or all of the circuitry of FIG. 4 may, thus, be instantiated at the same or different times. Some or all of the circuitry may be instantiated, for example, in one or more threads executing concurrently and/or in series. Moreover, in some examples, some or all of the circuitry of FIG. 4 may be implemented within one or more virtual machines and/or containers executing on the microprocessor.

In some examples, the processor circuitry 1612 of FIG. 16 may be in one or more packages. For example, the microprocessor 1700 of FIG. 17 and/or the FPGA circuitry 1800 of FIG. 18 may be in one or more packages. In some examples, an XPU may be implemented by the processor circuitry 1612 of FIG. 16, which may be in one or more packages. For example, the XPU may include a CPU in one package, a DSP in another package, a GPU in yet another package, and an FPGA in still yet another package.

Figure 19:
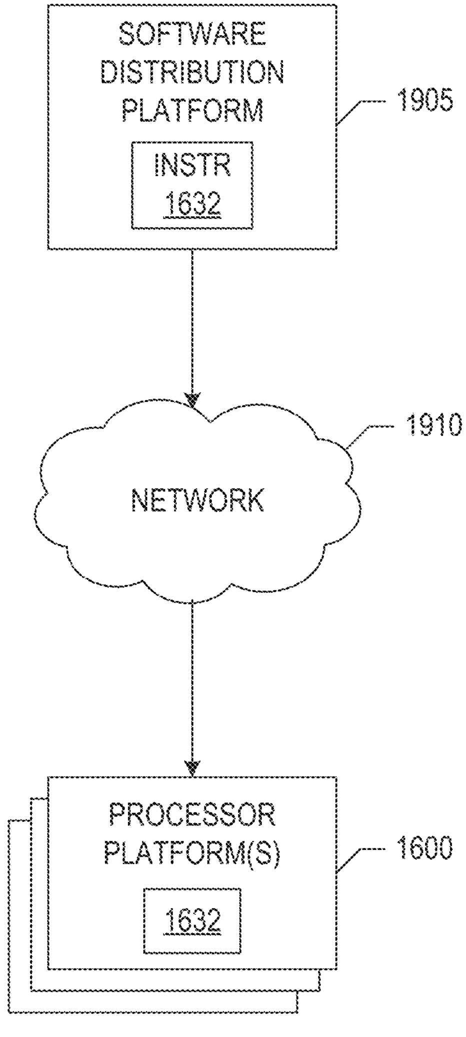
FIG. 19 is a block diagram of an example software distribution platform (e.g., one or more servers) to distribute software (e.g., software corresponding to the example machine readable instructions of FIGS. 14 and 15) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1632 of FIG. 16 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1632 of FIG. 16. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1632, which may correspond to the example machine readable instructions and/or the operations 1400, 1500 of FIGS. 14 and 15, as described above. The one or more servers of the example software distribution platform 1905 are in communication with an example network 1910, which may correspond to any one or more of the Internet and/or any of the example networks 1626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1632 from the software distribution platform 1905. For example, the software, which may correspond to the example machine readable instructions 1632 of FIG. 16, may be downloaded to the example processor platform 1600, which is to execute the machine readable instructions 1632 to implement the user interface control system 404. In some examples, one or more servers of the software distribution platform 1905 periodically offer, transmit, and/or force updates to the software (e.g., the example machine readable instructions 1632 of FIG. 16) to ensure improvements, patches, updates, etc., are distributed and applied to the software at the end user devices.

From the foregoing, it will be appreciated that example systems, methods, apparatus, and articles of manufacture have been disclosed that ignore, reject, prevent, suppress, and/or otherwise does not initiate touch actions corresponding to a touch on a touchscreen of an electronic device that may be caused by accidental touching during folding, unfolding, transportation, and/or handling of the electronic device. As such, the examples disclosed herein reduce (e.g., minimize) or prevent unintentional actions. This reduces user frustration and helps to conserve power.

Examples and combinations of examples disclosed herein include the following:

Example 1 is an electronic device comprising a body including a first body portion and a second body portion that is movable relative to the first body portion. The first and second body portions are movable between a folded configuration and an unfolded configuration. The electronic device also includes a touchscreen carried by the body, a sensor carried by the body, machine readable instructions, and processor circuitry to be programmed by the machine readable instructions to: determine, based on sensor data from the sensor, the body is being folded or unfolded, detect a touch on the touchscreen, and prevent a touch action corresponding to the touch based on the determination the body is being folded or unfolded.

Example 2 includes the electronic device of Example 1, wherein the first and second body portions are coupled via a hinge, and the sensor includes a hinge angle sensor to measure an angle or position of the hinge.

Example 3 includes the electronic device of Examples 1 or 2, wherein the sensor includes an accelerometer.

Example 4 includes the electronic device of Example 3, wherein the accelerometer is a first accelerometer carried by the first body portion, the electronic device further including a second accelerometer carried by the second body portion, and the sensor data is from the first and second accelerometers.

Example 5 includes the electronic device of any of Examples 1-4, wherein the sensor data is first sensor data, the sensor is a first sensor, and further including a grip sensor carried by the body. The processor circuitry is to determine body is being folded or unfolded based on the first sensor data and second sensor data from the grip sensor.

Example 6 includes the electronic device of Example 5, wherein the grip sensor is carried by a frame bezel around the touchscreen.

Example 7 includes the electronic device of Example 5, wherein the grip sensor is carried by an edge of the body.

Example 8 includes the electronic device of any of Examples 1-7, wherein the touchscreen is a foldable touchscreen. The touchscreen extends across both the first body portion and the second body portion.

Example 9 includes the electronic device of any of Examples 1-8, wherein the electronic device is a tablet.

Example 10 is a non-transitory machine readable storage medium comprising instructions that, when executed, cause processor circuitry to at least: determine, based on sensor data, an electronic device is being folded or unfolded, the electronic device including a touchscreen; detect a touch on the touchscreen while the electronic device is being folded or unfolded; and suppress a touch action corresponding to the touch based on the determination the electronic device is being folded or unfolded.

Example 11 includes the non-transitory machine readable storage medium of Example 10, wherein the instructions cause the processor circuitry to determine the electronic device is being folded or unfolded based on a change in an angle or position of a hinge.

Example 12 includes an electronic device comprising a first body portion and a second body portion that is movably coupled to the first body portion, a touchscreen having an active area, a bezel around the active area of the touchscreen, a grip sensor below the bezel, computer readable instructions, and processor circuitry to, based on the computer readable instructions: detect, based on sensor data from the grip sensor, a first touch on the bezel; detect a second touch on the active area of the touchscreen while the first touch occurs on the bezel; and not initiate a touch action associated with the second touch due to the first touch on the bezel.

Example 13 includes the electronic device of Example 12, wherein the bezel corresponds to an inactive area of the touch screen.

Example 14 includes the electronic device of Example 12, wherein the bezel is a frame bezel.

Example 15 includes the electronic device of any of Examples 12-14, wherein the processor circuitry is to determine whether the second touch is within a threshold distance of a location of the first touch on the bezel.

Example 16 includes the electronic device of Example 15, wherein the processor circuitry is to not initiate the touch action based on the second touch occurring within the threshold distance of the location of the first touch on the bezel.

Example 17 includes the electronic device of any of Examples 12-16, wherein the grip sensor includes at least one of a capacitive touch sensor or a resistive touch sensor.

Example 18 includes the electronic device of any of Examples 12-17, further including a motion sensor, the processor circuitry to determine the body is being folded or unfolded based on sensor data from the motion sensor.

Example 19 includes the electronic device of Example 18, wherein the processor circuitry is to not initiate the touch action based on a determination the body is being folded or unfolded.

Example 20 includes the electronic device of any of Examples 12-19, wherein the first and second body portions are coupled by a hinge.

Example 21 includes a non-transitory machine readable storage medium comprising instructions that, when executed, cause processor circuitry to at least: detect a first touch on a bezel of an electronic device based on sensor data from a grip sensor, the bezel surrounding an active area of a touchscreen of the electronic device, the grip sensor disposed below the bezel; detect a second touch on the active area of the touchscreen while the first touch occurs on the bezel; and not initiate a touch action associated with the second touch based on the first touch on the bezel.

Example 22 includes the non-transitory machine readable storage medium of Example 21, wherein the instructions, when executed, cause the processor circuitry to: determine whether the second touch is within a threshold distance of a location of the first touch on the bezel; and not initiate the touch action based on a determination the second touch is within the threshold distance of the location of the first touch on the display bezel.

Example 23 is an electronic device comprising a body including a first body portion and a second body portion that is movable relative to the first body portion. The first and second body portions are movable between a folded configuration and an unfolded configuration. The electronic device also comprises a touchscreen carried by the body; means for sensing relative motion of the first and second body portions; means for determining the body is being folded or unfolded based input from the sensing means; means for detecting a touch on the touchscreen; and means for preventing a touch action corresponding to the touch based on the determination the body is being folded or unfolded.

Example 24 includes the electronic device of Example 23, further including means for detecting a touch on the body. The determining means is to determine the body is being folded based on input from the sensing means and input from the means for detecting the touch on the body.

Example 25 includes the electronic device of Example 24, wherein the means for detecting the touch on the body is carried by a frame bezel around the touchscreen.

Example 26 includes the electronic device of Example 24, wherein the means for detecting the touch on the body is carried on an edge of the body.

Example 27 includes the electronic device of any of Examples 23-26, wherein the touchscreen is a foldable touchscreen, and the touchscreen extends across both the first body portion and the second body portion.

Example 28 includes the electronic device of any of Examples 23-27, wherein the electronic device is a tablet.

Example 29 is an electronic device comprising a first body portion and a second body portion that is movably coupled to the first body portion, a touchscreen having an active area, a bezel around the active area of the touchscreen, means for detecting a first touch on the bezel, the means for detecting the first touch being below the bezel, means for detecting a second touch on the active area of the touchscreen while the first touch occurs on the bezel, and means for suppressing a touch action associated with the second touch due to the first touch on the bezel.

Example 30 includes the electronic device of Example 29, wherein the bezel corresponds to an inactive area of the touch screen.

Example 31 includes the electronic device of Example 29, wherein the bezel is a frame bezel.

Example 32 includes the electronic device of any of Examples 29-31, wherein the means for detecting the second touch is to determine whether the second touch is within a threshold distance of a location of the first touch on the bezel.

Example 33 includes the electronic device of Example 32, wherein the means for suppressing the second touch is to suppress the touch action based on the second touch occurring within the threshold distance of the location of the first touch on the bezel.

Example 34 includes the electronic device of any of Examples 29-33, further including means for determining the body is being folded or unfolded.

Example 35 includes the electronic device of Example 34, wherein the means for suppressing is to suppress the touch action based on a determination the body is being folded or unfolded.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A non-transitory machine readable storage medium comprising instructions to cause at least one processor circuit to at least:

determine, based on sensor data from a grip sensor, an electronic device is being folded or unfolded, the electronic device including a touchscreen;

determine, based on the sensor data from the grip sensor, a first location of a grip on a body of the electronic device;

detect a touch on the touchscreen while the electronic device is being folded or unfolded;

determine whether a second location of the touch is within a threshold distance of the first location of the grip; and suppress a touch action corresponding to the touch based on the determination the second location is within the threshold distance.

2. The non-transitory machine readable storage medium of claim 1, wherein the instructions cause one or more of the at least one processor circuit to determine the electronic device is being folded or unfolded based on a change in an angle or position of a hinge.

3. An electronic device comprising:

a first body portion and a second body portion that is moveably coupled to the first body portion;

a touchscreen having an active area;

a bezel around the active area of the touchscreen;

a grip sensor below the bezel;

computer readable instructions; and at least one processor circuit to, based on the computer readable instructions:

detect, based on sensor data from the grip sensor, a first touch on the bezel;

detect a second touch on the active area of the touchscreen while the first touch occurs on the bezel;

determine whether the second touch is within a threshold distance of a location of the first touch on the bezel; and not initiate a touch action associated with the second touch due to the second touch occurring within the threshold distance of the location of the first touch on the bezel.

4. The electronic device of claim 3, wherein the bezel corresponds to an inactive area of the touch screen.

5. The electronic device of claim 3, wherein the bezel is a frame bezel.

6. The electronic device of claim 3, wherein the grip sensor includes at least one of a capacitive touch sensor or a resistive touch sensor.

7. The electronic device of claim 3, including a motion sensor, one or more of the at least one processor circuit to determine the body is being folded or unfolded based on sensor data from the motion sensor.

8. The electronic device of claim 7, wherein one or more of the at least one processor circuit is to not initiate the touch action based on a determination the body is being folded or unfolded.

9. The electronic device of claim 3, wherein the first and second body portions are coupled by a hinge.

* * * * *